(12) United States Patent
Noyori et al.

(10) Patent No.: US 8,482,204 B2
(45) Date of Patent: Jul. 9, 2013

(54) VEHICLE LAMP

(75) Inventors: Yasushi Noyori, Shizuoka (JP);
Takayoshi Kitagawa, Shizuoka (JP)

(73) Assignee: Koito Manufacturing Co., Ltd.,
Minato-ku, Tokyo (JP)

( * ) Notice: Subject to any disclaimer, the term of this patent is extended or adjusted under 35 U.S.C. 154(b) by 380 days.

(21) Appl. No.: 12/759,957

(22) Filed: Apr. 14, 2010

(65) Prior Publication Data

US 2010/0270927 A1 Oct. 28, 2010

(30) Foreign Application Priority Data

Apr. 23, 2009 (JP) ................................ 2009-105546

(51) Int. Cl.
*B60Q 1/14* (2006.01)
(52) U.S. Cl.
USPC .......................................................... 315/77
(58) Field of Classification Search
USPC .................... 315/76–80, 82, 291, 307, 224
See application file for complete search history.

(56) References Cited

U.S. PATENT DOCUMENTS

| | | | | |
|---|---|---|---|---|
| 7,114,828 B2* | 10/2006 | Yagi | ............................. | 362/231 |
| 7,188,985 B2* | 3/2007 | Ishida | ........................... | 362/548 |
| 7,208,723 B2* | 4/2007 | Takenaga et al. | ........ | 250/227.25 |
| 7,618,170 B2* | 11/2009 | Sugiyama et al. | ............ | 362/510 |
| 7,798,689 B2* | 9/2010 | Kagiyama | ..................... | 362/538 |
| 2004/0240221 A1* | 12/2004 | Choi | ............................. | 362/510 |
| 2008/0259625 A1* | 10/2008 | Noyori et al. | ................. | 362/507 |
| 2009/0154188 A1* | 6/2009 | Ito et al. | ......................... | 362/547 |

FOREIGN PATENT DOCUMENTS

| | | |
|---|---|---|
| JP | 6-214539 | 8/1994 |
| JP | 10-188609 | 7/1998 |
| JP | 2004-273180 | 9/2004 |
| JP | 2009-76323 | 4/2009 |

OTHER PUBLICATIONS

Japanese Patent Office, communication in patent application 2009-105546 (May 14, 2013) (with English translation).

* cited by examiner

*Primary Examiner* — Minh D A
(74) *Attorney, Agent, or Firm* — Fish & Richardson P.C.

(57) ABSTRACT

A vehicle lamp includes: an infrared light semiconductor light source which emits infrared light; a white light semiconductor light source which emits white light; and a control unit including: a current supply circuit which supplies a light source driving current to each of the infrared light semiconductor light source and the white light semiconductor light source; and a light source abnormality detecting unit which detects abnormality of the white light semiconductor light source and stops a driving operation of the infrared light semiconductor light source when the abnormality is detected.

11 Claims, 4 Drawing Sheets

VEHICLE LAMP

This application claims priority from Japanese Patent Application No. 2009-105546, filed on Apr. 23, 2009, the entire contents of which are incorporated herein by reference.

BACKGROUND

1. Technical Field

The present disclosure relates to a vehicle lamp for controlling a lighting operation of a light source unit including an infrared light semiconductor light source emitting infrared light and a white light semiconductor light source emitting white light.

2. Related Art

A known vehicle lamp includes an infrared light LED (Light Emitting Diode) as an infrared light semiconductor light source for emitting infrared light, a white light LED as a white light semiconductor light source for emitting white light, a current supply unit for supplying a light source driving current to each of the infrared light LED and the white light LED, and a control unit for controlling the light source driving current (see, e.g., JP-A-2004-273180).

Since the infrared light emitted from the infrared light LED has a wavelength longer than that of visible light, scattering hardly occurs in the infrared light. For this reason, for example, the infrared light is used in a night monitor for photographing an object at night.

On the other hand, the infrared light LED emits red light which can cause glare for the driver of an oncoming vehicle or a vehicle traveling in front of the vehicle with the infrared light LED. Accordingly, the vehicle lamp is provided with a white light LED, which improves safety of a vehicle in a traveling mode by eliminating red light so as to prevent glare.

Nevertheless, since the existing vehicle lamp has a configuration in which the infrared light LED is continuously driven so as to emit red light even when the white light LED is abnormal, the safety of the vehicle in the traveling mode can become degraded.

SUMMARY

Exemplary embodiments of the present invention address the above problems as well as other problems not described above. However, the present invention is not required to overcome the disadvantages described above and, thus, some implementations of the present invention may not overcome the problems described above.

An aspect of some implementations of the invention is to improve the safety of a vehicle in a traveling mode by stopping a driving operation of the infrared light LED when operation of the white light LED is abnormal.

According to one or more illustrative aspects of the present invention, a vehicle lamp includes an infrared light semiconductor light source which emits infrared light; a white light semiconductor light source which emits white light; and a control unit. The control unit includes a current supply circuit which supplies a light source driving current to each of the infrared light semiconductor light source and the white light semiconductor light source; and a light source abnormality detecting unit which detects abnormality of the white light semiconductor light source and stops a driving operation of the infrared light semiconductor light source when the abnormality is detected.

According to some implementations of the present invention, when the abnormality of the white light semiconductor light source is detected by the control unit, the infrared light semiconductor light source is controlled so as to stop the driving operation thereof.

Also, according to some implementations of the present invention, when the abnormality is detected, it is possible to detect the abnormality of the white light semiconductor light source, and to turn off the infrared light semiconductor light source. Thus, it is possible to improve the safety of the vehicle in a traveling mode when the white light semiconductor light source is abnormal.

According to some aspects of the present invention, the vehicle lamp further includes a cooling fan which cools the infrared light semiconductor light source. The control unit controls a fan driving current for driving the cooling fan, and further includes a fan abnormality detecting unit which detects abnormality of the cooling fan and stops the driving operation of the infrared light semiconductor light source when the abnormality is detected.

When the abnormality of the cooling fan is detected, it is possible to turn off the infrared light semiconductor light source and to stop rotational driving operation of the cooling fan.

According to some aspects of the present invention, the fan abnormality detecting unit receives a pulse signal transmitted from the cooling fan and synchronized with the number of rotations of the cooling fan, and transmits a fan abnormality detecting signal when a frequency of the pulse signal is equal to or less than a given value.

It is thus possible to turn off the infrared light semiconductor light source reliably and to stop the rotational driving operation of the cooling fan by reliably detecting an abnormality of the cooling fan.

Other aspects and advantages of the present invention will be apparent from the following description, the drawings and the claims.

DETAILED DESCRIPTION OF EXEMPLARY EMBODIMENTS

A vehicle lamp according to an embodiment of the invention is described below with reference to the drawings.

Vehicle lamps 1 are disposed, respectively, on both left and right sides of a front end part of a vehicle body.

Figure 1:
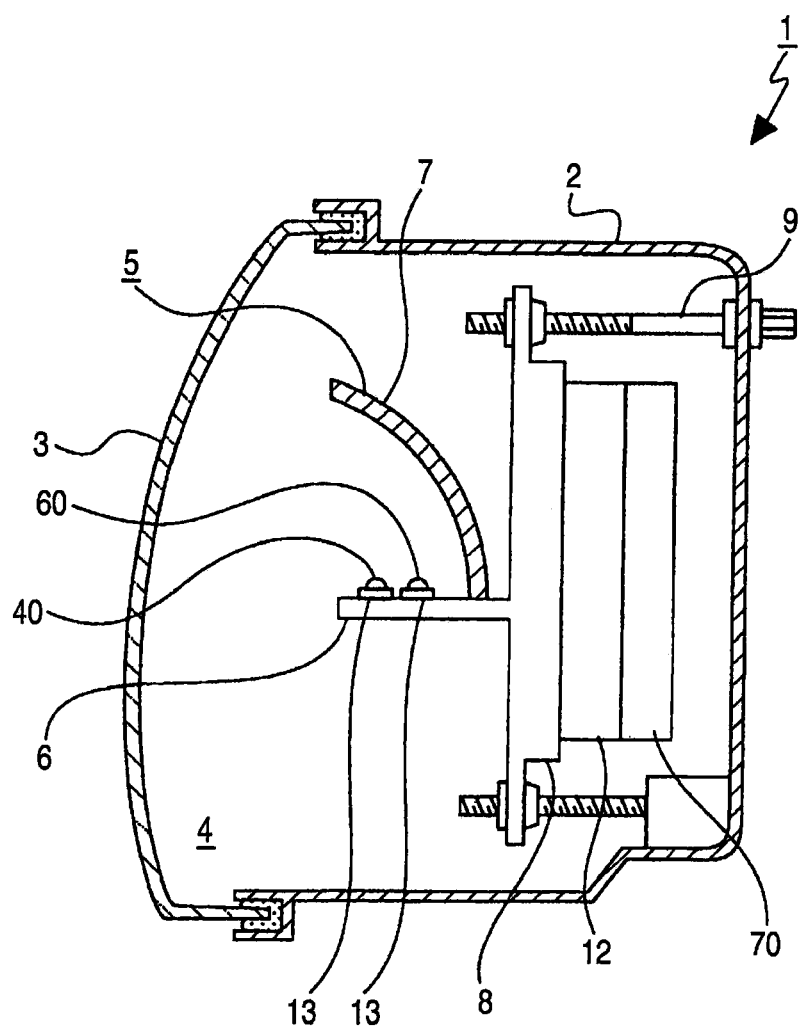
FIG. 1 is a sectional view illustrating a schematic configuration of a vehicle lamp according to an embodiment of the invention.

As shown in FIG. 1, each of the vehicle lamps 1 includes a lamp body 2 whose front side is open and a cover 3 that covers the front side of the lamp body 2. An interior space formed by the lamp body 2 and the cover 3 provides a lamp chamber 4.

A lamp unit 5 is disposed in the lamp chamber 4. The lamp unit 5 includes: a reflector 7 which is opened forward; a bracket 8 which includes a substrate attachment portion 6 whose front and rear surfaces are directed in the vertical direction; a substrate 13 which is attached to the substrate attachment portion 6; an infrared light LED 40 which is an infrared light semiconductor light source mounted on the substrate 13; and a white light LED 60 which is a white light semiconductor light source mounted on the substrate 13. The infrared light LED 40 is used as a night monitor light source. The white light LED 60 simultaneously eliminates infrared light of the infrared light LED 40 and serves as a clearance lamp.

A heat sink 12 and a cooling fan 70 are attached to the rear surface of the bracket 8.

The lamp unit 5 is tiltably supported to the lamp body 2 because the bracket 8 is connected to an optical axis adjusting mechanism 9. Accordingly, when the lamp unit 5 is tilted relative to the lamp body 2 by the optical axis adjusting mechanism 9, the direction of the light emitted from the infrared light LED 40 and the white light LED 60 is controlled.

Figure 2:
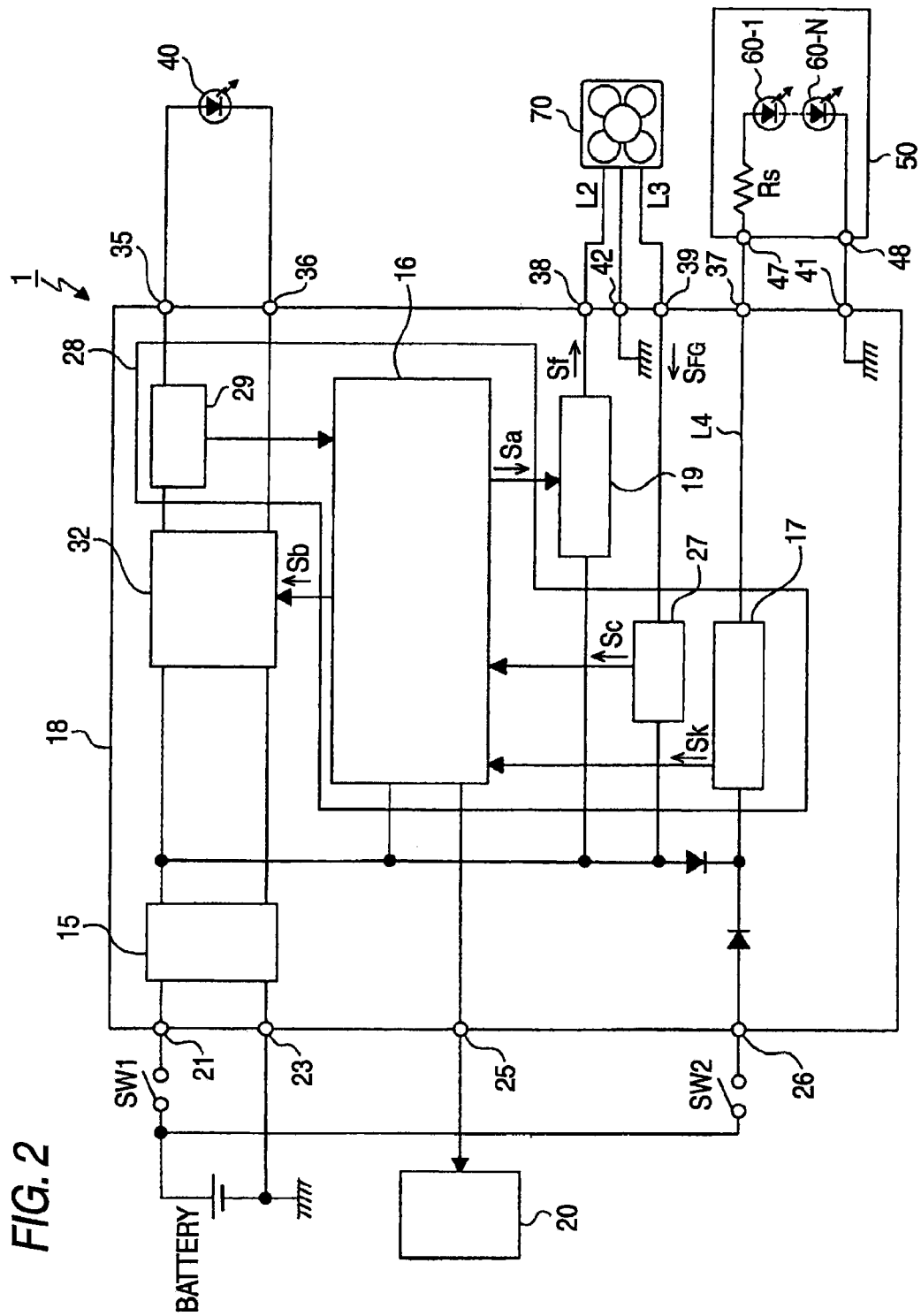
FIG. 2 illustrates a circuit configuration of the vehicle lamp.

As shown in FIG. 2, the vehicle lamp 1 includes a control unit 18, the infrared light LED 40, the white light LEDs 60-1 to 60-N (where N is an integer equal to or more than two), and the cooling fan 70.

The control unit 18 includes an input circuit 15, a current supply circuit 32, a light source abnormality detecting circuit 28, and a constant voltage circuit 19 which supplies a fan driving current Sf to the cooling fan 70.

The light source abnormality detecting circuit 28 includes: a control circuit 16 which transmits a control signal Sa as an ON/OFF signal to a switch element (not shown) of the constant voltage circuit 19; an infrared light abnormality detecting circuit 29 which detects abnormality of the infrared light LED 40; a color eliminating abnormality detecting circuit 17 which detects abnormality of the white light LEDs 60-1 to 60-N; and a fan abnormality detecting circuit 27 which is a fan abnormality detecting unit for detecting abnormality of the cooling fan 70.

The control unit 18 is provided with power supply terminals 21, 23, and 26, a signal input terminal 25, power supply output terminals 35, 37, and 38, and GND (ground) power supply output terminals 36, 41 and 42. The power supply terminal 21 is connected to a positive terminal of a battery (DC power supply) mounted to the vehicle via a power supply switch SW1 which supplies power to the current supply circuit 32 so as to turn on or off the infrared light LED 40. The power supply terminal 23 is connected to a negative terminal (GND) of the battery. The power supply terminal 26 is connected to the positive terminal of the battery via a power supply switch SW2 which supplies power to the current supply circuit 32 so as to turn on or off the white light LEDs 60-1 to 60-N.

The signal input terminal 25 is connected to an ECU (Electric Control Unit) 20 mounted to the vehicle. Communication signals with a control device (not shown) for controlling various functions provided in the vehicle are input or output via the signal input terminal 25.

The input circuit 15 includes a noise filter and a surge protection element (e.g., a surge absorber and a power zener) such as a dump surge. Accordingly, it is possible to prevent an overvoltage surge from being applied to the cooling fan 70.

The constant voltage circuit 19 includes a switch element (not shown) which receives the control signal Sa from the control circuit 16 so as to perform an ON/OFF operation, and is connected to the cooling fan 70 via the power supply output terminal 38.

As the current supply circuit 32, a switching regulator can be used and includes, for example, a transformer or a coil, a capacitor, a diode, and a switch element (NMOS (Negative channel Metal Oxide Semiconductor) transistor) receiving a control signal Sb from the control circuit 16 so as to perform an ON/OFF operation.

The current supply circuit 32 supplies a light source driving current to the infrared light LED 40 and the white light LEDs 60-1 to 60-N.

The inside of the infrared light abnormality detecting circuit 29 has a shunt resistance (not shown) as a circuit element used for detecting the light source driving current.

A white-light light source 50 includes the white light LEDs 60-1 to 60-N and a resistance Rs. The white-light light source unit 50 has input terminals 47 and 48. The input terminal 47 is connected to the color eliminating abnormality detecting circuit 17 via an LED output line L4 and the power supply output terminal 37, and the input terminal 48 is connected to the power supply output terminal 36.

The input terminal of the cooling fan 70 is connected to the constant voltage circuit 19 via a signal line L2, and the output terminal thereof is connected to the fan abnormality detecting circuit 27 via a signal line L3.

When the control signal Sa as an ON signal is transmitted from the control circuit 16 to the switch element of the constant voltage circuit 19, the fan driving current Sf is supplied to the cooling fan 70 via the signal line L2.

When the power supply switch SW1 is turned on, the light source driving current is supplied to the infrared light LED 40 via the current supply circuit 32, so that the infrared light LED 40 is turned on. When the power supply switch SW2 is turned on, the light source driving current is supplied to the white light LEDs 60-1 to 60-N via the current supply circuit 32, so that the white light LEDs 60-1 to 60-N are turned on.

Regarding the power supply of the white light LEDs 60-1 to 60-N, a circuit configuration is used in which an OR logic is performed by selecting the DC power (infrared light power) of the battery supplied via the power supply switch SW1 or the white light power (not shown) supplied via the power supply switch SW2. For example, even when the power supply switch SW1 is turned off at daytime when the infrared light LED 40 is turned off, if only the power supply switch SW2 is turned on, the power supply to the white light LEDs 60-1 to 60-N is performed.

When the fan driving current Sf is supplied to the cooling fan 70, the cooling fan 70 is driven rotationally. Control of the number of rotations of the cooling fan 70 is performed so that the output voltage of the constant voltage circuit 19 is changed.

While the cooling fan 70 is driven rotationally, detection of an FG signal $S_{FG}$ (Frequency Generator Signal) is performed. The FG signal $S_{FG}$ is a pulse signal synchronized with the number of rotations of the cooling fan 70, and is provided to the fan abnormality detecting circuit 27 via an FG signal line L3, and is used for the detection of the abnormality of the cooling fan 70.

The frequency of the FG signal $S_{FG}$ monotonously decreases as the number of rotations of the cooling fan 70 decreases and, when a rotor (not shown) of the cooling fan 70 is stopped (locked), the FG signal $S_{FG}$ becomes a signal fixed at a high level or a low level.

Figure 3:
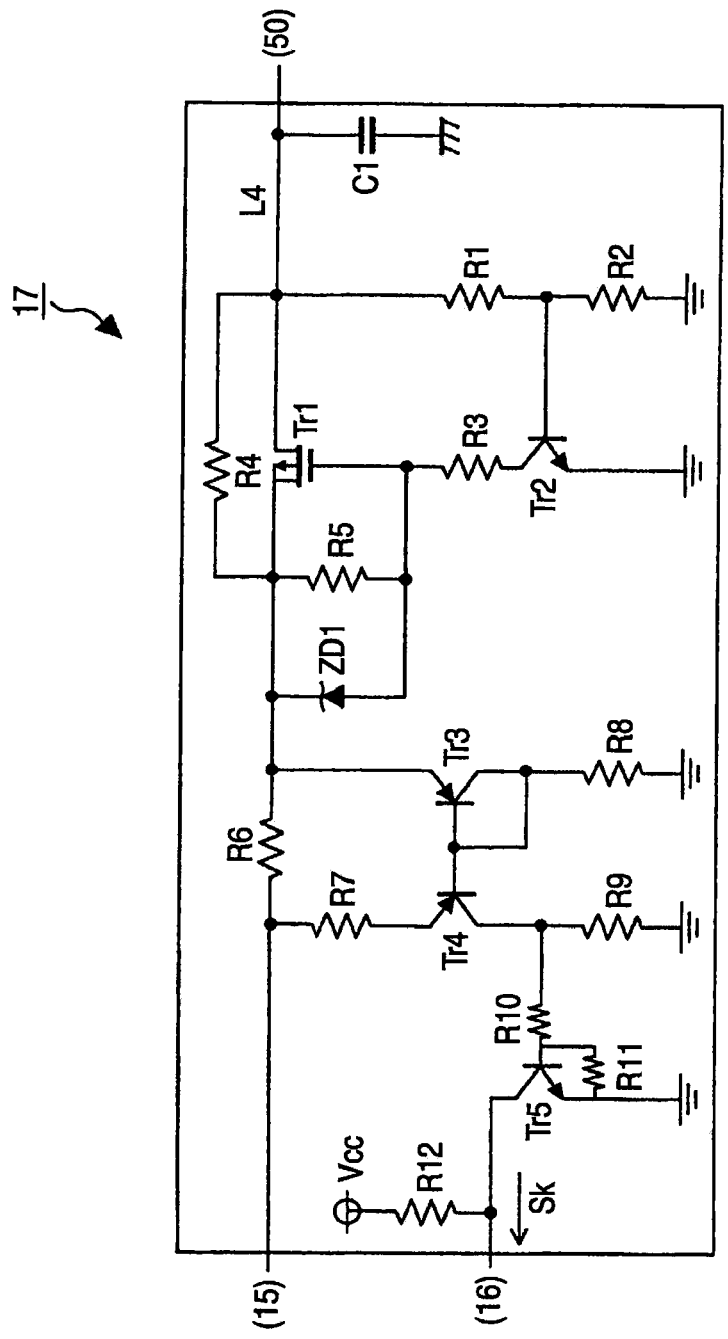
FIG. 3 illustrates a configuration of a color eliminating abnormality detecting circuit.

Next an operation of the color eliminating abnormality detecting circuit 17, in the case where an abnormality occurs on account of a broken wire condition, a grounded condition, and a short-circuit condition of the LED output line L4 of the white light LEDs 60-1 to 60-N, is described in connection with FIG. 3.

In the illustrated example, the color eliminating abnormality detecting circuit 17 includes: an abnormality detecting unit which includes a PMOS transistor Tr1, an NPN transistor Tr2, resistances R1 to R5, and a zener diode ZD1; a current detecting unit which includes PNP transistors Tr3 and Tr4 and resistances R6 to R9; and an NPN transistor Tr5 which transmits an abnormality detecting signal Sk.

In the case where the LED output line L4 is normal, since the light source driving current flows to the resistance R6, the NPN transistor Tr5 is turned on. When the NPN transistor Tr5 is turned on, the voltage signal from the control power supply Vcc flows to the ground via the collector and the emitter of the NPN transistor Tr5.

Accordingly, the abnormality detecting signal Sk is not transmitted to the control circuit 16, but the control signals Sa and Sb as ON signals are transmitted, respectively, from the control circuit 16 to the switch elements of the constant voltage circuit 19 and the current supply circuit 32. For this reason, the light source driving current is supplied continuously to the infrared light LED 40, and the fan driving current Sf is supplied continuously to the cooling fan 70.

In the case where the LED output line L4 is broken, the NPN transistor Tr2 is turned on so that the PMOS transistor Tr1 is turned on, but the light source driving current does not flow to the resistance R6. Accordingly, the NPN transistor Tr5 is turned off, so that a voltage signal having a predetermined voltage value is transmitted as the abnormality detecting signal Sk from the control power supply Vcc to the control circuit 16. The control circuit 16 receives the abnormality detecting signal Sk, and transmits the control signals Sa and Sb as OFF signals to the switch elements of the constant voltage circuit 19 and the current supply circuit 32, respectively.

In the case where the LED output line L4 is grounded or is a short-circuit, the NPN transistor Tr2 is turned off, and the PMOS transistor Tr1 is turned off, so that the light source driving current does not flow to the resistance R6. Accordingly, the NPN transistor Tr5 is turned off, so that a voltage signal having a predetermined voltage value is transmitted as the abnormality detecting signal Sk from the control power supply Vcc to the control circuit 16. The control circuit 16 receives the abnormality detecting signal Sk, and transmits the control signals Sa and Sb as OFF signals to the switch elements of the constant voltage circuit 19 and the current supply circuit 32, respectively.

When the switch element of the current supply circuit 32 receives the control signal Sb, the switch element thereof is turned off. When the switch element of the current supply circuit 32 is turned off, the supply of the light source driving current to the infrared light LED 40 is stopped. When the switch element of the constant voltage circuit 19 receives the control signal Sa, the switch element thereof is turned off. When the switch element of the constant voltage circuit 19 is turned off, supply of the fan driving current Sf to the cooling fan 70 is stopped.

When supply of the light source driving current to the infrared light LED 40 is stopped and supply of the fan driving current Sf to the cooling fan 70 is stopped, the rotational driving operation of the cooling fan 70 is stopped at the same time when the infrared light LED 40-1 is turned off.

As described above, when an abnormality is detected by the color eliminating abnormality detecting circuit 17, it is possible to detect reliably the abnormality on account of a broken wire condition, a grounded condition, and a short-circuit condition of the LED output line L4 and thus to turn off the infrared light LED 40 reliably. Accordingly, it is possible to improve the safety of the vehicle in a traveling mode.

Figure 4:
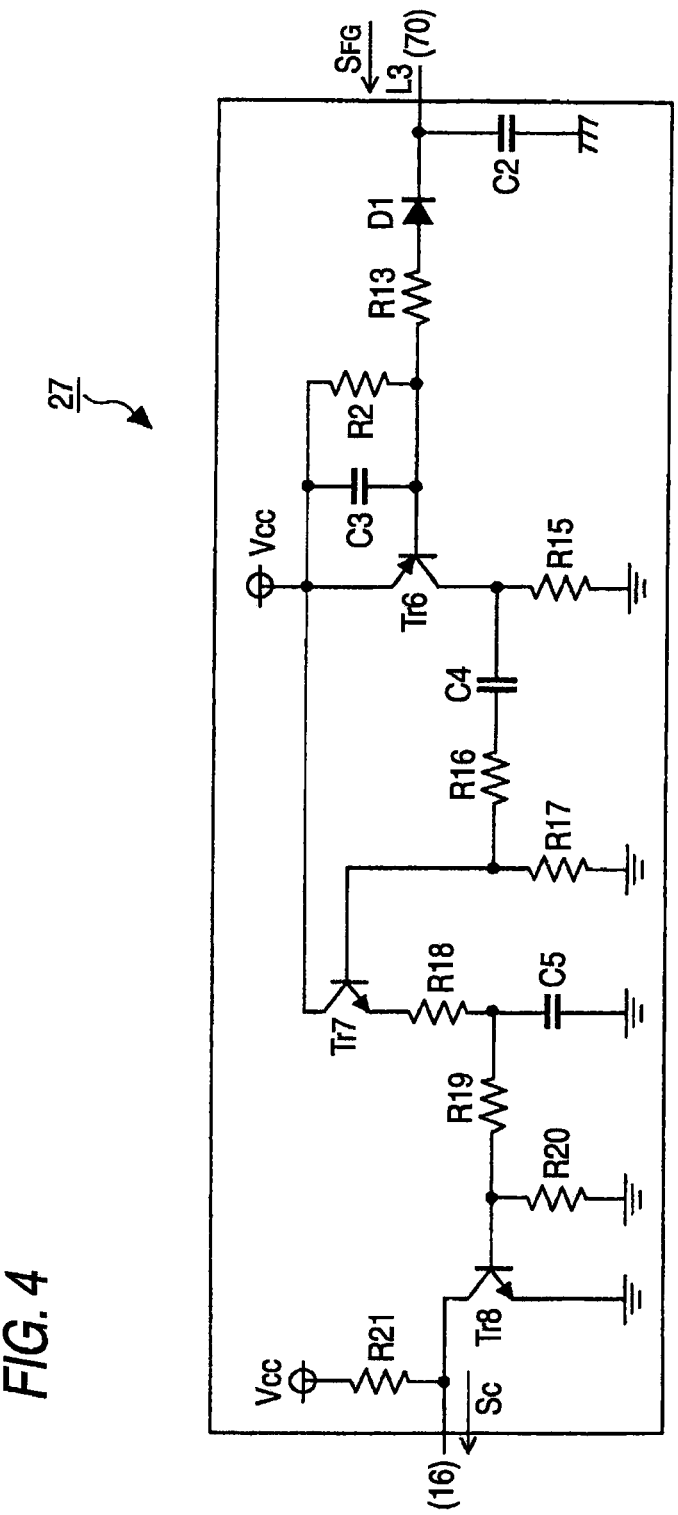
FIG. 4 illustrates a configuration of a fan abnormality detecting circuit.

Next, an operation of the fan abnormality detecting circuit 27, in the case where the abnormality occurs in the cooling fan 70 or the abnormality occurs in the FG signal line L3 on account of a grounded condition, a short-circuit condition, and an opened condition, is described in connection with FIG. 4.

In the illustrated example, the fan abnormality detecting circuit 27 includes: a differential circuit which includes a capacitor C4 and a resistance R16; an integral circuit which includes a capacitor C5 and a resistance R18; a PNP transistor Tr6; and NPN transistors Tr7; and Tr8. The base of the PNP transistor Tr6 is connected to the anode of the diode D1 via the resistance R13, and the collector thereof is connected to the base of the NPN transistor Tr7 via the capacitor C4 and the resistance R16. The emitter of the NPN transistor Tr7 is connected to the base of the NPN transistor Tr8 via the resistances R18 and R19.

In the case where the cooling fan 70 or the FG signal line L3 is normal, the FG signal $S_{FG}$ having a pulse shape is output from the cooling fan 70, and the PNP transistor Tr6 is repeatedly turned on or off. When the FG signal $S_{FG}$ is a high level, the PNP transistor Tr6 is turned off, and when the FG signal $S_{FG}$ is a low level, the PNP transistor Tr6 is turned on.

The differential circuit including the capacitor C4 and the resistance R16 provides a differential signal obtained by differentiating the FG signal $S_{FG}$. The differential signal is a signal in which a rising portion of the FG signal $S_{FG}$, immediately after changing from the low level to the high level, corresponds to a rising edge (hereinafter, referred to as a "first differential signal"), and a falling portion thereof, immediately after changing from the high level to the low level, corresponds to a falling edge (hereinafter, referred to as a "second differential signal").

The NPN transistor Tr7 buffers and provides as an output the second differential signal.

The integral circuit including the capacitor C5 and the resistance R18 integrates the second differential signal, and discharges a charge of the capacitor C5 in accordance with the time constant determined by the capacitor C5 and the resistances R19 and R20. That is, the integral circuit outputs a voltage (a frequency-voltage converting signal) in accordance with the frequency of the second differential signal.

The NPN transistor Tr8 is turned on by the frequency-voltage converting signal. When the NPN transistor Tr8 is turned on, the voltage signal flows from the control power supply Vcc to the ground via the collector and the emitter of the NPN transistor Tr8.

Accordingly, in the case where the cooling fan 70 or the FG signal line L3 is normal, a fan abnormality detecting signal Sc is not transmitted to the control circuit 16, but the control signals Sa and Sb as ON signals are transmitted, respectively, from the control circuit 16 to the switch elements of the constant voltage circuit 19 and the current supply circuit 32. For this reason, the light source driving current is supplied continuously to the infrared light LED 40, and the fan driving current Sf is supplied continuously to the cooling fan 70.

Next, in the case where the abnormality occurs in the cooling fan 70 transmitting the FG signal $S_{FG}$ as the pulse signal synchronized with the number of rotations of the cooling fan 70, for example, in the case where the number of rotations of the cooling fan 70 decreases, the frequency of the pulse signal transmitted to the fan abnormality detecting circuit 27 decreases. Accordingly, the frequency of the second differential signal decreases, and the frequency-voltage converting signal also decreases.

Accordingly, the NPN transistor Tr8 is turned off, and the voltage signal having a predetermined voltage value is transmitted as the fan abnormality detecting signal Sc from the control power supply Vcc to the control circuit 16. The control circuit 16 receives the fan abnormality detecting signal Sc, and transmits the control signals Sa and Sb as OFF signals to the switch elements of the constant voltage circuit 19 and the current supply circuit 32, respectively.

When the switch element of the current supply circuit 32 receives the control signal Sb, the switch element is turned off. When the switch element of the current supply circuit 32 is turned off, the supply of the light source driving current to the infrared light LED 40 is stopped. When the switch element of the constant voltage circuit 19 receives the control signal Sa, the switch element is turned off. When the switch element of the constant voltage circuit 19 is turned off, the supply of the fan driving current Sf to the cooling fan 70 is stopped.

When the supply of the light source driving current to the infrared light LED 40 is stopped and the supply of the fan driving current Sf to the cooling fan 70 is stopped, the rotational driving operation of the cooling fan 70 is stopped at the same time when the infrared light LED 40 is turned off.

In addition, even in the case where the FG signal line L3 is grounded, short-circuited, or broken (opened), the fan abnormality detecting signal Sc is transmitted from the fan abnormality detecting circuit 27 to the control circuit 16 in the same manner as described above. The control circuit 16 receives the fan abnormality detecting signal Sc, and transmits the control signals Sa and Sb as OFF signals to the switch elements of the constant voltage circuit 19 and the current supply circuit 32, respectively. Accordingly, the rotational driving operation of the cooling fan 70 is stopped at the same time when the infrared light LED 40 is turned off.

As described above, when the abnormality is detected by the fan abnormality detecting circuit 27, it is possible to detect reliably the abnormality of the cooling fan 70 and the grounded condition, the short-circuit condition, and the broken wire condition of the FG signal line L3. Accordingly, it is possible to reliably turn off the infrared light LED 40, and to stop the rotational driving operation of the cooling fan 70.

In addition, the infrared light LED 40 and the cooling fan 70 may be stopped such that the abnormality detecting signal Sc is directly provided as an OFF signal to the switch elements of the constant voltage circuit 19 and the current supply circuit 32.

As described above, since the white light LEDs 60-1 to 60-N serve as a clearance lamp in addition to eliminating the infrared light, the white light LEDs 60-1 to 60-N are continuously turned on even when the abnormality occurs in the infrared light LED 40, so that the function of the clearance lamp is exhibited continuously.

Furthermore, in the case where the abnormality of any one of the infrared light LED 40, the white light LEDs 60-1 to 60-N, and the cooling fan 70 is detected, the abnormality signal also is provided to the ECU 20.

Although the present invention has been shown and described with reference to certain exemplary embodiments, other implementations are within the scope of the claims. It will be understood by those skilled in the art that various changes in form and details may be made therein without departing from the spirit and scope of the invention as defined by the appended claims.

What is claimed is:

1. A vehicle lamp comprising:
    an infrared light semiconductor light source which emits infrared light;
    a white light semiconductor light source which emits white light;
    a cooling fan which cools the infrared light semiconductor light source; and
    a control unit that controls a fan driving current for driving the cooling fan, the control unit comprising:
        a current supply circuit which supplies a light source driving current to each of the infrared light semiconductor light source and the white light semiconductor light source;
        a light source abnormality detecting unit which detects abnormality of the white light semiconductor light source and stops a driving operation of the infrared light semiconductor light source in response to detecting the abnormality; and
        a fan abnormality detecting unit which detects abnormality of the cooling fan and stops the driving operation of the infrared light semiconductor light source in response to detecting the abnormality of the cooling fan.

2. The vehicle lamp according to claim 1, wherein the fan abnormality detecting unit receives a pulse signal transmitted from the cooling fan and synchronized with the number of rotations of the cooling fan, and transmits a fan abnormality detecting signal when a frequency of the pulse signal is equal to or less than a given value.

3. The vehicle lamp according to claim 1, wherein the abnormality is at least one of a broken wire condition, a grounded condition or a short-circuit condition with respect to an output of the white light semiconductor light source.

4. The vehicle lamp of claim 3, wherein light source abnormality detecting unit is configured such that, if the abnormality is detected, the light source abnormality detecting unit provides a signal to the current supply circuit so as to cause the current supply circuit to stop supplying the light source driving current to the infrared light semiconductor source.

5. The vehicle lamp of claim 3, wherein the light source abnormality detecting unit comprises circuitry to detect the abnormality and to provide a signal indicative of the occurrence of the abnormality to a control circuit, which provides, in response, a signal to the current supply circuit so as to cause the current supply circuit to stop supplying the light source driving current to the infrared light semiconductor source.

6. The vehicle lamp of claim 5, wherein the circuitry to detect the abnormality comprises a switch that is turned off when the circuitry detects the abnormality such that a voltage of a predetermined value is provided as an output signal from the circuitry to the control circuit.

7. The vehicle lamp of claim 6, wherein the circuitry to detect the abnormality comprises a pair of switches, both of which are turned on if an abnormality of a first type is detected and both of which are turned off if an abnormality of a second type is detected.

8. A vehicle lamp comprising:
    an infrared light semiconductor light source which emits infrared light;
    a white light semiconductor light source which emits white light;
    a cooling fan which cools the infrared light semiconductor light source; and
    a control unit comprising:
        a current supply circuit which supplies a light source driving current to each of the infrared light semiconductor light source and the white light semiconductor light source;
        a light source abnormality detecting unit which detects abnormality of the white light semiconductor light source and stops a driving operation of the infrared light semiconductor light source in response to detecting the abnormality, wherein the abnormality is at least one of a broken wire condition, a grounded condition or a short-circuit condition with respect to an output of the white light semiconductor light source, wherein the light source abnormality detecting unit comprises circuitry to detect the abnormality and to provide a signal indicative of the occurrence of the abnormality to a control circuit, which provides, in response, a signal to the current supply circuit so as to cause the current supply circuit to stop supplying the light source driving current to the infrared light semiconductor source, wherein the control unit controls a fan driving current for driving the cooling fan, and wherein the control circuit provides, in response to the signal indicative of the occurrence of the abnormality, a signal to stop supply of the fan driving current to the cooling fan.

9. The vehicle lamp of claim 8 comprising:

a constant voltage circuit to supply the fan driving current to the cooling fan, wherein the control circuit provides, in response to the signal indicative of the occurrence of the abnormality, a signal to the constant voltage circuit so as to stop supplying the fan driving current to the cooling fan.

10. A method for operating a vehicle lamp comprising:

detecting occurrence of an abnormality of a white light semiconductor light source in the vehicle lamp;

stopping a driving operation of an infrared light semiconductor light source in the vehicle lamp in response to detecting the abnormality;

detecting occurrence of an abnormality of a cooling fan which cools the infrared light semiconductor light source; and stopping driving operation of the infrared light semiconductor light source in response to detecting the abnormality of the cooling fan.

11. The method of claim 10, wherein the abnormality is at least one of a broken wire condition, a grounded condition or a short-circuit condition with respect to an output of the white light semiconductor light source.

* * * * *